United States Patent [19]
Doi et al.

[11] Patent Number: 4,963,992
[45] Date of Patent: Oct. 16, 1990

[54] APPARATUS FOR RECORDING/REPRODUCING DIGITAL VIDEO SIGNALS IN BOTH A STANDARD MODE AND A LONG PLAYING MODE

[75] Inventors: Nobukazu Doi, Hachioji; Yoshizumi Eto, Sagamihara; Morishi Izumita, Inagi; Seiichi Mita, Kanagawa; Kazuyuki Takeshita, Hachioji, all of Japan

[73] Assignee: Hitachi, Ltd., Tokyo, Japan

[21] Appl. No.: 301,462

[22] Filed: Jan. 26, 1989

[30] Foreign Application Priority Data

Jan. 29, 1988 [JP] Japan .................................. 63-17224

[51] Int. Cl.⁵ .......................... H04N 5/76; H04N 5/92
[52] U.S. Cl. ..................................... 358/335; 360/32; 360/33.1; 360/39; 358/13
[58] Field of Search ................. 358/13, 138, 310, 335, 358/337–339; 360/32, 33.1, 39

[56] References Cited

U.S. PATENT DOCUMENTS

| | | | |
|---|---|---|---|
| 4,597,023 | 6/1986 | Rijckaert | 360/77.14 |
| 4,633,330 | 12/1986 | Yamamitsu et al. | 358/310 |
| 4,847,701 | 7/1989 | Suesada | 358/335 |
| 4,870,661 | 9/1989 | Yamada et al. | 358/13 X |

*Primary Examiner*—Robert L. Richardson
*Attorney, Agent, or Firm*—Antonelli, Terry, Stout & Kraus

[57] ABSTRACT

An apparatus for recording an reproducing a digital video signal is disclosed which includes n sampling circuits each for performing a sub-Nyquist sampling operation for the digital video signal in such a manner that the amount of data is reduced to one-n-th of an original amount (where n is a positive integer) and a pixel sampled by the sub-Nyquist sampling operation is not sampled by the remaining sampling circuits, recording/reproducing means for recording and reproducing information at all or part of pixels which are sampled by the n sampling circuits and a device for reconstructing the digital video signal from reproduced information at pixels with the aid of a synthesizing technique or interpolation technique.

4 Claims, 3 Drawing Sheets

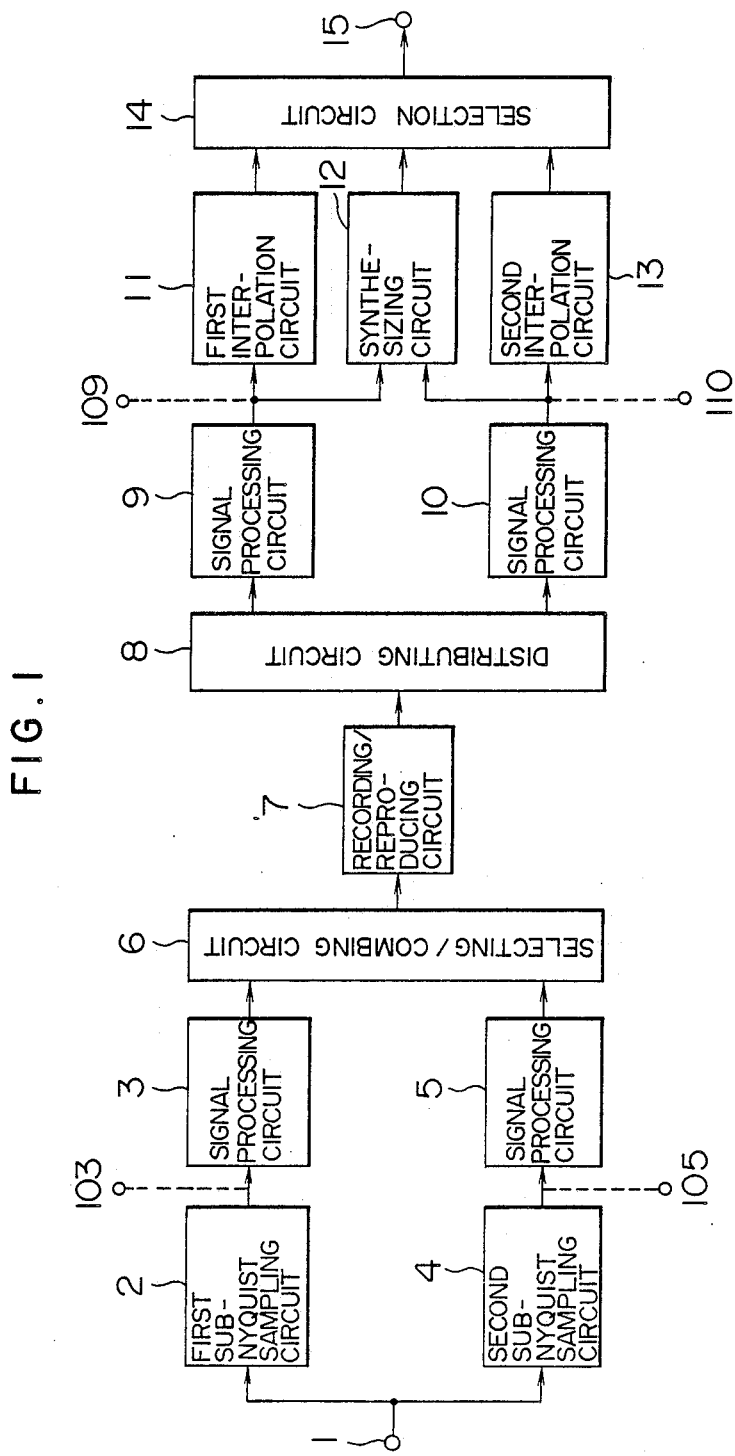

APPARATUS FOR RECORDING/REPRODUCING DIGITAL VIDEO SIGNALS IN BOTH A STANDARD MODE AND A LONG PLAYING MODE

BACKGROUND OF THE INVENTION

The present invention relates to an apparatus for recording and reproducing a digital video signal, and more particularly to a circuit configuration which is used for recording and reproducing a digital video signal in both a standard mode and a long playing mode and is suitable for use in various recording/reproducing apparatuses different in hierarchy from each other.

A digital VTR (namely, digital video tape recorder) for recording and reproducing a video signal in the form of a digital signal is known. That is, a digital VTR for recording a PCM signal which is obtained by performing a sampling operation for a video signal in such a manner that a Nyquist condition is satisfied, directly on a tape, is described in an article entitled "Digital Video Recording Techniques using ½ inch Metal Particle Tape" by S. Mita et al. (IEEE Consumer Electronics, Aug. 1985, pages 386 to 397).

Further, a digital VTR for compressing the above-mentioned PCM signal by the high-efficiency coding techniques using Hadamard transformation, to elongate the recording/reproducing time per unit length of a recording tape, is disclosed in an article entitled "High Density Recording and Bit Rate Reduction for a 2-hour Digital VTR" by C. Yamamitsu et al. (Video Audio & Data Recording, Mar. 1986, pages 113 to 120).

It is desirable that a digital VTR can record and reproduce a video signal in both a standard mode and a long playing mode as in a home-use analog VTR which adopts one of the Beta-and VHS-methods and uses a ½ inch cassette tape.

In the digital VTR disclosed in the above article, however, the PCM signal used in the standard mode and the signal which is obtained by compressing the PCM signal by the high-efficiency coding techniques using Hadamard transformation and is used in the long playing mode, are utterly different in signal form from each other. Hence, in order to record and reproduce a video signal in both the standard mode and the long playing mode by the digital VTR, the digital VTR is required to have a signal processing circuit for the standard mode and another signal processing circuit for the long playing mode. Thus, the VTR is complicated in circuit construction, and becomes high in manufacturing cost.

SUMMARY OF THE INVENTION

It is an object of the present invention to provide an apparatus which can record and reproduce a digital video signal in both a standard mode and a long playing mode, without arousing the above-mentioned problem.

The sub-Nyquist sampling, in which a sampling operation is performed at a frequency lower than a Nyquist rate, can be used to compress a video signal. In the present invention, the sub-Nyquist sampling is used for coding the video signal at high efficiency.

In order to attain the above object, according to the present invention, there is provided an apparatus for recording and reproducing a digital video signal which comprises first sampling means for performing a first sub-Nyquist sampling operation for a video signal (that is, first sampling means for performing a first sampling operation for the video signal in such a manner that a Nyquist condition is not satisfied), at least second sampling means for performing a second sub-Nyquist sampling operation for the video signal in such a manner that the first and second sub-Nyquist sampling operations do not specify the same pixel, recording/reproducing means for recording and reproducing information at pixels which are sampled by at least one of the first and second sampling means, and means for reconstructing the video signal from the reproduced information at the pixels which are sampled by at least one of the first and second sampling means, with the aid of one of a synthesizing technique and an interpolation technique.

In other words, a video signal recording/ reproducing apparatus according to the present invention comprises n sampling means (where n is a positive integer) each for performing a sub-Nyquist sampling operation for the digital video signal in such a manner that the amount of data is reduced to one-n-the of an original amount and a pixel sampled by the sub-Nyquist operation is not sampled by the remaining sampling means, recording/reproducing means for recording and reproducing information at at least a part of pixels sampled by the n sampling means, and means for reconstructing the digital video signal from the reproduced information at pixels with the aid of one of a synthesizing technique and an interpolation technique.

In a video-signal recording/reproducing apparatus according to the present invention, a first sub-Nyquist sampling operation is performed for a video signal, and at least a second sub-Nyquist sampling operation is performed for pixels other than those sampled by the first sub-Nyquist sampling operation. Further, information at pixels sampled by the first and second sub-Nyquist sampling operations is used in both the standard mode and the long playing mode. Accordingly, a signal used in the standard mode and a signal used in the long playing mode resemble one another in signal form. Hence, a video signal can be recorded and reproduced in both the standard mode and the long playing mode, only by combining simple circuits. Further, the above-mentioned construction according to the present invention can be used in various recording/reproducing apparatuses different in hierarchy from each other.

In a case where a video signal is recorded in the standard mode, information at all the pixels sampled by a plurality of sampling means is recorded. In a case where a reproducing operation is performed in the standard mode, the video signal is reconstructed from the reproduced information at the pixels sampled by a plurality of sampling means.

While, in a case where a video signal is recorded in the long playing mode, information at pixels sampled by part of plural sampling means is recorded. In a case where a reproducing operation is performed in the long playing mode, information at a pixel which is not sampled by part of plural sampling means, is estimated from reproduced information at pixels which exist before and behind the above pixel, by an interpolation method, to be used for reconstructing the video signal.

BRIEF DESCRIPTION OF THE DRAWINGS

FIG. 1 is a block diagram showing the circuit configuration of an embodiment of a recording/reproducing apparatus according to the present invention.

DESCRIPTION OF THE PREFERRED EMBODIMENTS

In the present invention, sub-Nyquist sampling is used for coding a video signal at high efficiency. In the following explanation, a sub-Nyquist sampling operation will be performed for an NTSC video signal at a frequency twice higher than $f_{sc}$ (namely, the frequency of sub-carrier).

Figure 2A:
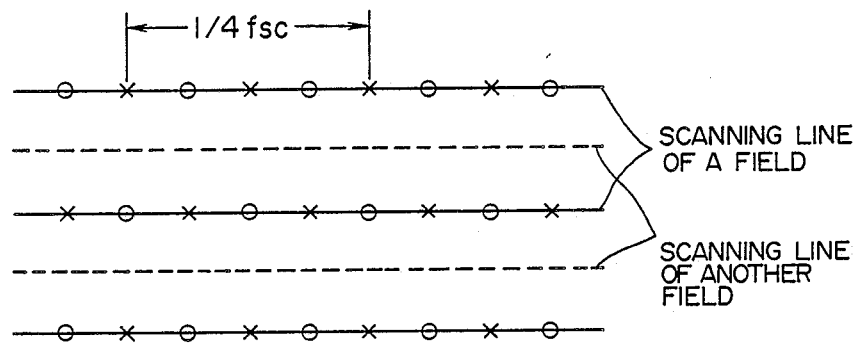
FIG. 2A is a schematic diagram for explaining the sampling method of the embodiment of FIG. 1.
Figure 2B:
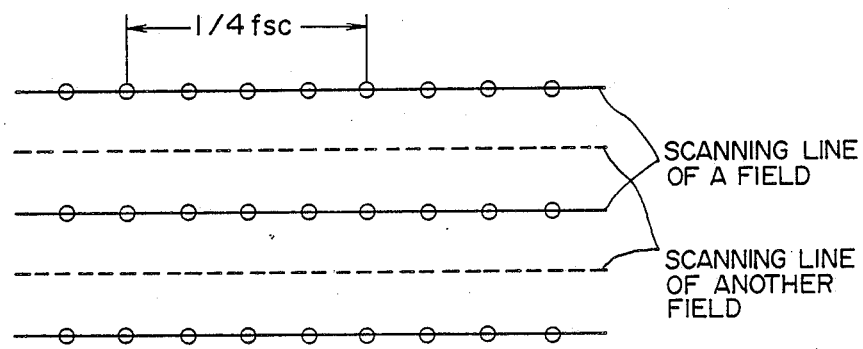
FIG. 2B is a schematic diagram for explaining the sampling method of a conventional recording/reproducing apparatus.

FIG. 2A is a schematic diagram for explaining the sampling method of an embodiment of an apparatus for recording and reproducing a digital video signal in accordance with the present invention, and FIG. 2B is a schematic diagram for explaining the sampling method of a conventional recording/reproducing apparatus.

In FIG. 2B showing the sampling operation of the conventional recording/reproducing apparatus, a sign o designates pixels sampled by a Nyquist sampling operation which is performed for a video signal at a frequency higher than a Nyquist rate of 4 $f_{sc}$.

While, according to the sub-Nyquist sampling used in the present invention, pixels which are indicated by a sign x in FIG. 2A, are not sampled, and thus the number of sampled pixels is one-half the number of pixels which are sampled by the Nyquist sampling operation shown in FIG. 2B.

Now, let us consider a case where first and second sub-Nyquist sampling operations are performed for a video signal so that pixels indicated by the sign o in FIG. 2A are sampled by the first sub-Nyquist sampling operation and pixels indicated by the sign x are sampled by the second sub-Nyquist sampling operation. It is to be noted that the first and second sub-Nyquist sampling operations do not specify the same pixel. In a case where a recording operation for a video signal is performed in the standard mode, information at pixels which are sampled by the first and second sub-Nyquist sampling operations, is recorded on a tape. In a case where a reproducing operation is performed for the tape in the standard mode, the video signal is reconstructed from reproduced information at pixels sampled by the first and second sub-Nyquist sampling operations.

While, in a case where a recording operation for the video signal is performed in the long playing mode, information at pixels which are sampled by one of the first and second sub-Nyquist sampling operations, is recorded on a tape. In a case where a reproducing operation is performed for the tape in the long playing mode, information at a pixel which is not sampled by one of the first and second sub-Nyquist sampling operations, is estimated from reproduced information at pixels which exists before and behind the above pixel, by the interpolation method, to be used for reconstructing the video signal.

Figure 3A:
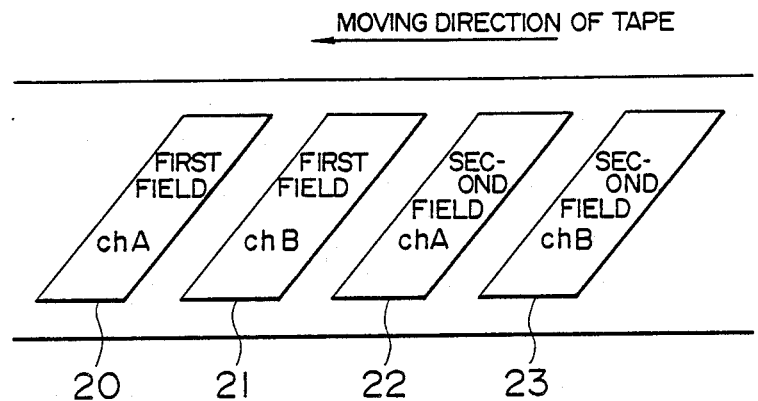
FIG. 3A is a schematic diagram showing the recording format on recording tape used in the standard mode.
Figure 3B:
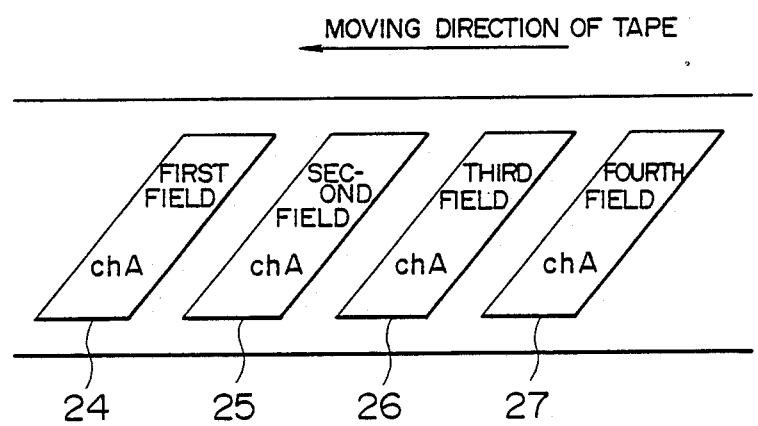
FIG. 3B is a schematic diagram showing the recording format on recording tape used in the long playing mode.

FIGS. 3A and 3B show recording formats on tape which are used in a case where a video signal recorded in the standard mode or long playing mode is classified into two channels chA and chB, to record a signal of one field on two tracks.

In FIG. 3A which shows the recording format used in the standard mode, reference numeral 20 designates information at pixels which are used in the first field and sampled by the first sub-Nyquist sampling operation, 21 information at pixels which are used in the first field and sampled by the second sub-Nyquist sampling operation, 22 information at pixels which are used in the second field and sampled by the first sub-Nyquist sampling operation, and 23 information at pixels which are used in the second field and sampled by the second sub-Nyquist sampling operation.

In FIG. 3B which shows the recording format used in the long playing mode, reference numeral 24 information at pixels which are used in the first field and sampled by the first sub-Nyquist sampling operation, 25 information at pixels which are used in the second field and sampled by the first sub-Nyquist sampling operation, 26 information at pixels which are used in the third field and sampled by the first sub-Nyquist sampling operation, and 27 information at pixels which are used in the fourth field and sampled by the first sub-Nyquist sampling operation. It is needless to say that information at pixels sampled by the second sub-Nyquist sampling operation may be recorded on a recording tape, in place of information at pixels sampled by the first sub-Nyquist sampling operation. Further, in the long playing mode, the tape speed is made equal to one-half the tape speed in the standard mode, and only one channel chA or chB is recorded and reproduced.

Next, explanation will be made of the circuit configuration and operation of an embodiment of an apparatus for recording and reproducing a digital video signal in accordance with the present invention, with reference to FIG. 1. FIG. 1 is a block diagram showing the circuit configuration of the above embodiment.

In FIG. 1, reference numeral 1 designates an input terminal, 2 a first sub-Nyquist sampling circuit, 4 a second sub-Nyquist sampling circuit, 3 and 5 signal processing circuits, 6 a selecting/combining circuit, 7 a recording/reproducing circuit, 8 a distributing circuit, 9 and 10 signal processing circuits, 11 a first interpolation circuit, 12 a synthesizing circuit, 13 a second interpolation circuit, 14 a selection circuit, 15 an output terminal, 103 and 105 input terminals for dubbing, and 109 and 110 output terminals for dubbing.

The recording operation of the present embodiment will first be explained. A video signal from the input terminal 1 is applied to the first and second sub-Nyquist sampling circuits 2 and 4. The video signal applied to the first sampling circuit 2 is subjected to a first sub-Nyquist sampling operation which is indicated by the sign o in FIG. 2A, and the video signal applied to the second sampling circuit 4 is subjected to a second sub-Nyquist sampling operation which is indicated by the sign x in FIG. 2A. The output signals of the first and second sub-Nyquist sampling circuits 2 and 4 are applied to the signal processing circuits 3 and 5, respectively, to be subjected to signal processing such as error-correcting code processing. In a case where the recording operation is performed in the standard mode, the signal sampled by the first sub-Nyquist sampling circuit 2 and the signal sampled by the second sub-Nyquist sampling operation are combined with each other by the selecting/combining combining circuit 6, and the combined signal is sent to the recording/reproducing circuit 7, to be recorded on a tape in the format shown in FIG. 3A. In a case where the recording operation is performed in the long playing mode, the signal sampled by the first sub-Nyquist sampling circuit 2 (or the signal sampled by the second sub-Nyquist sampling circuit 4) is selected by the selecting/combining circuit 6, and the selected signal is sent to the recording/reproducing circuit 7, to be recorded on a tape in the format shown in FIG. 3B.

Next, the reproducing operation of the present embodiment will be explained. In a case where the reproducing operation is performed in the standard mode, reproduced signals corresponding to the signals sampled by the first and second sub-Nyquist sampling circuits 2 and 4 are sent to the signal processing circuits 9 and 10, respectively, with the aid of the distributing circuit 8. After having been subjected to signal processing such as error correction, the reproduced signals are combined by the synthesizing circuit 12, to reconstruct the video signal. Further, in a case where a great deficiency in the reproduced signals is caused by the drop-out or special recording operations such as shuttle and slow driving, the first and second interpolation circuits 11 and 13 corresponding respectively to the first and second sub-Nyquist sampling circuits 2 and 4 are used to estimate information at an omitted pixel by an interpolation method. When the reproduced signals corresponding to the signals sampled by the first and second sub-Nyquist sampling circuits 2 and 4 have no error, the output signal of the synthesizing circuit 12 is selected by the selection circuit 14, to be sent to the output terminal 15. When the reproduced signal corresponding to the signal sampled by the first sub-Nyquist sampling circuit 2 has no error but the reproduced signal corresponding to the signal sampled by the second sub-Nyquist sampling circuit 4 has an error, the output signal of the first interpolation circuit 11 is selected by the selection circuit 14, to be sent to the output terminal 15. When the reproduced signal corresponding to the signal sampled by the first sub-Nyquist sampling circuit 2 has an error but the reproduced signal corresponding to the signal sampled by the second sub-Nyquist sampling circuit 4 has no error, the output signal of the second interpolation circuit 13 is selected by the selection circuit 14, to be sent to the output terminal 15.

In a case where the reproducing operation is performed in the long playing mode, the reproduced signal corresponding to the signal sampled by the first sub-Nyquist sampling circuit 2 is sent to the signal processing circuit 9 through the distributing circuit 8. After having been subjected to signal processing such as error correction, the reproduced signal is sent to the first interpolation circuit 11, to estimate information at a pixel which is not sampled by the first sub-Nyquist circuit 2, by an interpolation method. The output signal of the first interpolation circuit 11 is selected by the selection circuit 14, to be sent to the output terminal 15. Alternatively, the reproduced signal corresponding to the signal sampled by the second sub-Nyquist sampling circuit 4 may be sent to the second interpolation circuit 13 through the distributing circuit 8 and the signal processing circuit 10, to select the output signal of the second interpolation circuit 13 by the selection circuit 14.

In video tape recording technology, there is widely used a method which is called "dubbing". That is, a video signal which is reproduced from a tape by a first VTR, is record on another tape by a second VTR. When a digital video signal reproduced by a first digital VTR is recorded on a tape by a second digital VTR without being converted into an analog signal, the degradation in picture quality due to dubbing can be prevented.

For example, two digital VTR's (namely, recording and reproducing digital VTR's) each having the circuit configuration of FIG. 1 are used. Reproduced signals from terminals 109 and 110 of the reproducing digital VTR are applied to terminals 103 and 105 of the recording digital VTR. In a case where both of the reproducing and recording VTR's are operated in the standard mode, the reproduced signal from the terminal 109 of the reproducing VTR is applied to the terminal 103 of the recording VTR, and the reproduced signal from the terminal 110 of the reproducing VTR is applied to the terminal 105 of the recording VTR. In a case where either or both of the reproducing and recording VTR's are operated in the long playing mode, only the reproduced signal from the terminal 109 of the reproducing VTR is applied to the terminal 103 of the recording VTR. In other words, by using the above circuit configuration according to the present invention, various combinations of the standard mode and the long playing mode in the reproducing and recording VTR's are possible without converting a digital video signal into an analog signal.

In the present embodiment, a video signal is compressed by each of the first and second sub-Nyquist sampling circuits 2 and 4 so that the amount of data is reduced to one-half of an original amount. However, the present invention is not limited to such a sub-Nyquist sampling operation, but a sub-Nyquist sampling circuit for compressing the video signal so that the amount of data is reduced to one-n-th of an original amount, may be used in the present invention (where n is an integer greater than two).

As has been explained in the foregoing, according to the present invention, the signal used in the standard mode and the signal used in the long playing mode resemble one another in signal form, and hence each of recording and reproducing operations can be performed in a desired one of the standard mode and the long playing mode only by combining simple circuits. Further, a desired one of the standard mode and the long playing mode can be readily carried out in various recording/reproducing apparatuses different in hierarchy from each other. Furthermore, according to the present invention, a video signal can be reconstructed only by reproducing a signal which is sampled by one of a plurality of sub-Nyquist sampling circuits. Hence, even in a case where a great deficiency in reproduced signal is cassed by the drop-out or a special reproducing operation, an original video signal can be reconstructed from the insufficient reproduced signal.

What is claimed is:

1. An apparatus for recording and reproducing a digital video signal, comprising:
    n sampling means each for performing a sub-Nyquist sampling operation for the digital video signal in such a manner that every n-th pixel sampled by the sub-Nyquist sampling operation of one of the n sampling means is not sampled by the remaining ones of the n sampling means, where n is a positive integer of at least 2;
    recording/reproducing means for recording and reproducing information including pixels sampled by the n sampling means in a standard mode and by m sampling means in a long playing mode, where m is a positive integer less than n; and means for reconstructing the digital video signal from the reproduced information in the standard mode and from the reproduced information by interpolating pixels not samples by the m sampling means in the long playing mode.

2. A method of recording and reproducing a digital video signal, comprising the steps of:

performing n sub-Nyquist sampling operations for the digital video signal in such a manner that every n-th pixel sampled by one of n sub-Nyquist sampling operations is not sampled by the remaining sub-Nyquist sampling operations, where n is a positive integer of at least 2;

recording and reproducing information including pixels samples by the n sub-Nyquist sampling operations in a standard mode and by m sub-Nyquist sampling operations in a long playing mode, where m is a positive integer less than n; and reconstructing the digital video signal from the reproduced information in the standard mode and by interpolating pixels not sampled by the m sub-Nyquist sampling operations in the long playing mode.

3. An apparatus for recording and reproducing a digital video signal, comprising:

first and second sub-Nyquist sampling circuits each for performing a sub-Nyquist sampling operation for an input digital video signal so that every n-th pixel sampled by one of the first and second sub-Nyquist sampling circuits is not sampled by the other of the first and second sub-Nyquist sampling circuits, where n is a positive integer of at least 2;

first and second signal processing circuits for carrying out error-correcting ode processing for signals which are sampled by the first and second sub-Nyquist sampling circuits;

a selecting/combining circuit for selecting one of a signal which is sampled by the first sub-Nyquist sampling circuit, a signal which is sampled by the second sub-Nyquist sampling circuit, and a signal obtained by combining signals which are sampled by the first and second sub-Nyquist sampling circuits;

a recording/reproducing circuit for recording and reproducing the output signal of the selecting/combining circuit;

a distributing circuit for separating a signal which is reproduced by the recording/reproducing circuit, into a first reproduced signal corresponding to the signal sampled by the first sub-Nyquist sampling circuit and a second reproduced signal corresponding to the signal sampled by the second sub-Nyquist sampling circuit;

third and fourth signal processing circuits for carrying out error correction processing for the first and second reproduced signals, respectively;

a synthesizing circuit for combining the output signal of the third and fourth signal processing circuits;

first and second interpolation circuits for carrying out interpolation processing for the output signals of the third and fourth signal processing circuits, respectively; and a selection circuit for selecting one of the output signal of the synthesizing circuit, the output signal of the first interpolation circuit, and the output signal of the second interpolation circuit.

4. An apparatus for recording and reproducing a digital video signal, as claimed in claim 3, wherein a reproducing operation in a standard mode is performed in such a manner that the selection circuit selects the output signal of the synthesizing circuit when the first and second reproduced signals have no error, selects the output signal of the first interpolation circuit when the first reproduced signal has no error bu the second reproduced signal has an error, and selects the output signal of the second interpolation circuit when the first reproduced signal has an error but the second reproduced signal has no error.

* * * * *